United States Patent [19]

Terry

[11] Patent Number: 4,668,339

[45] Date of Patent: May 26, 1987

[54] PROCESS FOR DRY DEINKING OF SECONDARY FIBER SOURCES

[75] Inventor: Byron R. Terry, Neenah, Wis.

[73] Assignee: Kimberly-Clark Corporation, Neenah, Wis.

[21] Appl. No.: 793,460

[22] Filed: Oct. 28, 1985

Related U.S. Application Data

[63] Continuation-in-part of Ser. No. 554,174, Nov. 22, 1983, abandoned, which is a continuation-in-part of Ser. No. 450,812, Dec. 20, 1982, abandoned.

[51] Int. Cl.$^4$ .......................... D21B 1/08; D21C 5/02
[52] U.S. Cl. .......................................... 162/4; 162/5; 162/55; 162/13; 241/24; 241/28
[58] Field of Search .......................... 162/4, 5, 55, 13; 241/24, 28

[56] References Cited

U.S. PATENT DOCUMENTS

| | | |
|---|---|---|
| 1,417,961 | 5/1922 | Williams . |
| 1,422,251 | 7/1922 | Billingham . |
| 2,018,938 | 10/1935 | Wells . |
| 2,147,793 | 2/1939 | Kropp .................................. 162/159 |
| 2,166,926 | 7/1939 | Kropp .................................. 162/159 |
| 2,298,994 | 10/1942 | Wells . |
| 2,628,786 | 2/1953 | Piperoux et al. . |
| 2,874,908 | 2/1959 | Heritage . |
| 2,916,412 | 11/1960 | Altman . |
| 3,055,791 | 9/1962 | Elias . |
| 3,098,784 | 7/1963 | Gorman . |
| 3,179,555 | 4/1965 | Krodel . |
| 3,377,234 | 4/1968 | Illingworth . |
| 3,596,840 | 8/1971 | Blomqvist . |
| 3,736,221 | 5/1973 | Evers et al. . |
| 3,741,863 | 6/1973 | Brooks . |
| 3,773,613 | 11/1973 | Lee et al. . |
| 3,966,126 | 6/1976 | Werner . |
| 4,124,168 | 11/1978 | Bialski . |
| 4,145,007 | 3/1979 | Jetzer . |
| 4,252,279 | 2/1981 | Johansson et al. . |
| 4,305,507 | 12/1981 | Wittkopf . |

FOREIGN PATENT DOCUMENTS

| | | |
|---|---|---|
| 881748 | 7/1953 | Fed. Rep. of Germany . |
| 915294 | 7/1954 | Fed. Rep. of Germany . |
| 1097802 | 1/1961 | Fed. Rep. of Germany . |
| 2704035 | 8/1978 | Fed. Rep. of Germany . |
| 2836805 | 4/1979 | Fed. Rep. of Germany . |
| 670419 | 11/1929 | France . |
| 1295608 | 5/1961 | France . |
| 53-134902 | 4/1977 | Japan . |
| 247284 | 2/1926 | United Kingdom . |
| 940250 | 10/1963 | United Kingdom . |
| 1134611 | 11/1968 | United Kingdom . |
| 1228276 | 4/1971 | United Kingdom . |
| 1472705 | 5/1977 | United Kingdom . |
| 259624 | 7/1968 | U.S.S.R. . |
| 1052592 | 6/1982 | U.S.S.R. . |

OTHER PUBLICATIONS

Wochenblatt fur Papierfabrikation 23/24, 1981, pp. 927, 928 and 930 (Auflosung von Altpapier bei hoher Stoffdichte).
Wochenblatt fur Papierfabrikation 23/24, 1981 pp. 935–936 ("Turbosorter").
ABIPC #7863, vol. 34. No. 7, Mar. 1964.
Dry Comminution of Waste Paper, by M. V. Vanchakov, V. N. Erokhin, M. N. Anurov.

*Primary Examiner*—S. Leon Bashore
*Assistant Examiner*—K. M. Hastings
*Attorney, Agent, or Firm*—Gregory E. Croft; Donald L. Traut; Jeremiah J. Duggan

[57] ABSTRACT

Ink-bearing secondary fiber feedstocks are mechanically fiberized in a substantially dry state to produce substantially discrete fibers and ink-bearing fines, and the fibers are separated from the fines in a substantially dry state.

23 Claims, 7 Drawing Figures

PROCESS FOR DRY DEINKING OF SECONDARY FIBER SOURCES

This application is a continuation-in-part of application Ser. No. 554,174, filed Nov. 22, 1983, now abandoned, which is a continuation-in-part of application Ser. No. 450,812, filed Dec. 20, 1982 now abandoned.

BACKGROUND OF THE INVENTION

The commercial production of various types of paper requires the use of recycled paper as a source of papermaking fibers due to the expense of virgin fibers. Prior to using such secondary fiber sources for making a commercial product, it is necessary to treat the fiber source to remove unwanted chemical constituents which adversely affect the quality of the final paper product. The most notable contaminants to be removed are inks or dyes which adversely affect the color and brightness of secondary fibers used as a feedstock. Ink deposits on paper are extremely thin and roughly have a thickness of only about 0.0001 inch. Chemically, the inks are generally a mixture of pigment or organic dye, binder, and solvent. Some inks also contain metallic driers, plasticizers, and waxes to impart desired properties. Hence their chemical make-up can be very complex. However, inks are not to be equated with other additives or contaminants such as varnishes, sizes, and plasticizers, which are chemically and physically of a different nature as those skilled in the art of deinking will appreciate.

The prior art has addressed secondary fiber clean-up generally by subjecting secondary fiber sources to a variety of treatments. The most common form of treatment is chemical wet deinking. For example, U.S. Pat. No. 3,098,784 to Gorman teaches a process for deinking printed paper wherein the printed paper is slurried in water containing 0.2–5.0 percent (based on the weight of the paper) of a water-soluble non-ionic surface active agent at a temperature of from about 90°–180° F. The treatment is carried out in standard pulp fiberizing equipment wherein the paper stock is reduced to substantially individual fibers. U.S. Pat. No. 3,179,555 to Krodel et al. teaches an aqueous method using certain salts to induce a change in zeta potential between the ink particles and the material particles. A detergent is used to emulsify the separated ink particles, enabling them to be removed from the pulp by washing. U.S. Pat. No. 3,377,234 to Illingworth teaches a deinking agent for use in an aqueous solution comprising an admixture of alkyl sulfates, alkyl aryl sulfonates, and sodium polyphosphate. U.S. Pat. No. 1,422,251 (1922) to Billingham teaches disintegration of secondary fiber sources as a preparation for wet deinking. U.S. Pat. No. 2,018,938 (1935) to Wells teaches a wet deinking method wherein the waste paper is disintegrated in a soapy solution with a rod mill. U.S. Pat. No. 2,916,412 (1959) to Altmann et al. teaches a wet deinking method whereby slurried waste paper (3.25% consistency) is coarsely pulped and thereafter refined at a temperature below 112° F. to shatter the ink from the fibers. German Pat. No. 2,836,805 (1979) teaches slurrying waste paper in a pulper at a 3–5% consistency in the presence of electrolytes to cause the fibers to swell, thereby causing the inks to crumble. However, these and other wet deinking processes can be expensive and produce large quantities of sludge, which creates a disposal problem. In addition, there are certain types of papers which cannot be successfully deinked at all by conventional wet methods because they are chemically unreactive with the deinking agents.

Other treatments of secondary fibers have been directed toward separating other contaminants besides inks from the secondary fibers, such as plastic coatings and miscellaneous particulates. For example, French Pat. No. 1295608 (1961) teaches recovery of waste paper coated with synthetic materials or plastic films by wetting the waste paper and subjecting the slurry to attrition in a beating device. The hydrophobic plastic particles can be separated from the hydrophylic fibrous material, which has been disintegrated by the attrition mill into particles (fibers) which are smaller than the plastic particles. British Patent No. 940,250 (1963) teaches a method for recovering fibrous materials from waste paper products which have been coated with synthetic resins in the form of a rigid film. The waste material is exposed to vigorous mechanical treatment in the presence of less than 70 weight percent water to fiberize the material, while leaving the synthetic resin film in relatively large pieces. British Patent No. 1228276 (1971) teaches a method for recovering fibrous material from plastic coated or plastic-containing waste paper. The waste paper is fiberized in water whereby the plastic separates from the fibers in small particles. The plastic particles are then separated from the fibers. A Russian article entitled "Dry Comminution of Waste Paper", M. V. Vanchakov, V. N. Erokhin, M. N. Anurov (Jan. 14, 1981) teaches dry grinding of waste paper in a hammermill as a pretreatment prior to a hydropulper to separate large contaminants such as fasteners, cloth, polyethylene film, and others. The ground material was passed through separator screens having 4 mm. and 8 mm. diameter holes and the fractions passing through the screens were defiberized in a hydropulper. However, as suggested previously, none of these methods are directed to deinking. All are concerned with removal of plastic films and coatings, which separate out as relatively large pieces. Also, except for the Russian article, all of these methods use water and accordingly are not suggestive of a dry process. On the other hand, the Russian article does not suggest deinking, but rather is directed toward removal of large contaminants rather than fines.

Still other prior methods of treating waste papers use different approaches. For example, U.S. Pat. No. 3,736,221 (1973) to Evers et al. teaches a method for making shaped bodies from waste paper by fiberizing the waste paper in a hammermill, coating the fibers with an aqueous binder, compressed under pressure, and baked. No effort is made to remove the ink from the waste paper. U.S. Pat. No. 4,124,168 (1978) to Bialski et al. teaches a method for recovering different types of wastepaper from a mixed source by fragmenting the source materials and separating the various components by their fragmentability. This method only serves to classify various types of waste paper present in a mixed sample and does not attempt to remove the ink from the waste paper. German Patent No. 1097802 (1961) teaches a method for reclaiming waste paper by tearing the paper and cleaning it, crimping and rolling the torn paper in a practically dry state, and defibering in the dry state, optionally in the presence of dry steam. This method seeks to overcome difficulties in fiberizing waste papers coated with hydrophobic materials which do not respond well to aqueous methods. There is no teaching, however, that inks can be removed by such a dry treatment.

Accordingly there remains a need for a deinking process which avoids or minimizes sludge formation and chemical costs. Although various prior art treatments of waste paper have attempted to satisfy this need, none of the methods have been successful.

SUMMARY OF THE INVENTION

A deinking method has now been discovered which is simpler and more economical than the commonly used wet deinking methods. In general, the method comprises: (a) mechanically fiberizing an ink-bearing secondary fiber source or feedstock in a substantially dry state, preferably air dry, thereby producing substantially discrete fibers and fines; and (b) separating the fines from the fibers. Fiberization is conducted when the secondary fiber source is air dry or sufficiently dry to prevent adhesion of the resulting fibers and fines. The fines, which includes the ink-bearing fines, can be removed or separated from the fibers, for example, by screening through a screen having mesh openings sufficiently small to retain the fibers, yet large enough to permit the fines to pass through. The fines may comprise ink particles, fiber fragments bearing ink, other particulate matter bearing ink, such as loading or filler materials, fiber fragments formed during the fiberization, fiber fragments initially present in the secondary fiber source, and particulate loading or filler materials present in the secondary fiber source. It is understood, however, that in all instances at least a portion of the fines would include ink-bearing fines or ink particles.

The terms, as used herein and in the appended claims, have the following meanings:

"Secondary fiber source" means cellulosic products bearing or containing ink, such as printed waste paper, reclaimed for use as a source of papermaking fibers.

"Air dry" means the moisture content of the secondary fiber source is in equilibrium with the atmospheric conditions to which it is exposed.

"Substantially discrete fibers" means essentially individual fibers, with allowance for some fiber aggregates, which are many times longer than their diameter.

Typically, secondary fiber sources contain from about three to nine weight percent moisture, which, for purposes of this invention, is about the range for air dry paper. It, therefore, is preferred in carrying out the invention, that no additional water be present or added to the secondary fiber source to be fiberized. It has been found that as the water content of the paper increases, the energy requirement of the fiberization apparatus increases rapidly. This energy increase tends to destroy the fibers resulting in unacceptable fiber degradation. Also, as the water content increases, the fibers and fines formed during fiberization tend to agglomerate or adhere to each other, which can plug up the apparatus, hinder separation and diminish the yield of useable fiber. Hence, the secondary fiber source is in a substantially dry state when fiberization is conducted, and although water may be present or added, it should not be so much as to cause an unacceptable or uneconomical amount of fiber degradation or energy consumption or plugging of the fiberizer. A specific numerical limitation for the water content will depend mainly on the characteristics of the secondary fiber source and the operation and economics of the fiberization apparatus used in the process. These limitations can be determined by experimentation by those skilled in the art. In general, however, a moisture content of about 20 weight percent based on solids is believed to be a practical limit for most situations.

The process of this invention is particularly useful for removing inks from secondary fiber sources which have been treated or coated with a surface size or a barrier material. The size serves as a holdout to the ink in such a manner as to provide resistance to passage of the ink after application to the secondary fiber source. In such cases, at least some of the size or coating is removed with the ink fines during fiberization and separated from the fibers. Examples of barrier coatings or surface sizes include starches, casein, animal glue, carboxymethyl cellulose, polyvinyl alcohol, methyl cellulose, wax emulsions, and a variety of resin polymers.

The discrete fibers obtained by the process of this invention, which do not exhibit hydration (which is characteristic of fibers obtained by wet deinking methods), are suitable as secondary fiber and can be recycled for the manufacture of cellulosic products such as tissue, papers, pads, batting, sheeting, newsprint, and the like.

DETAILED DESCRIPTION OF THE DRAWING

Figure 1:
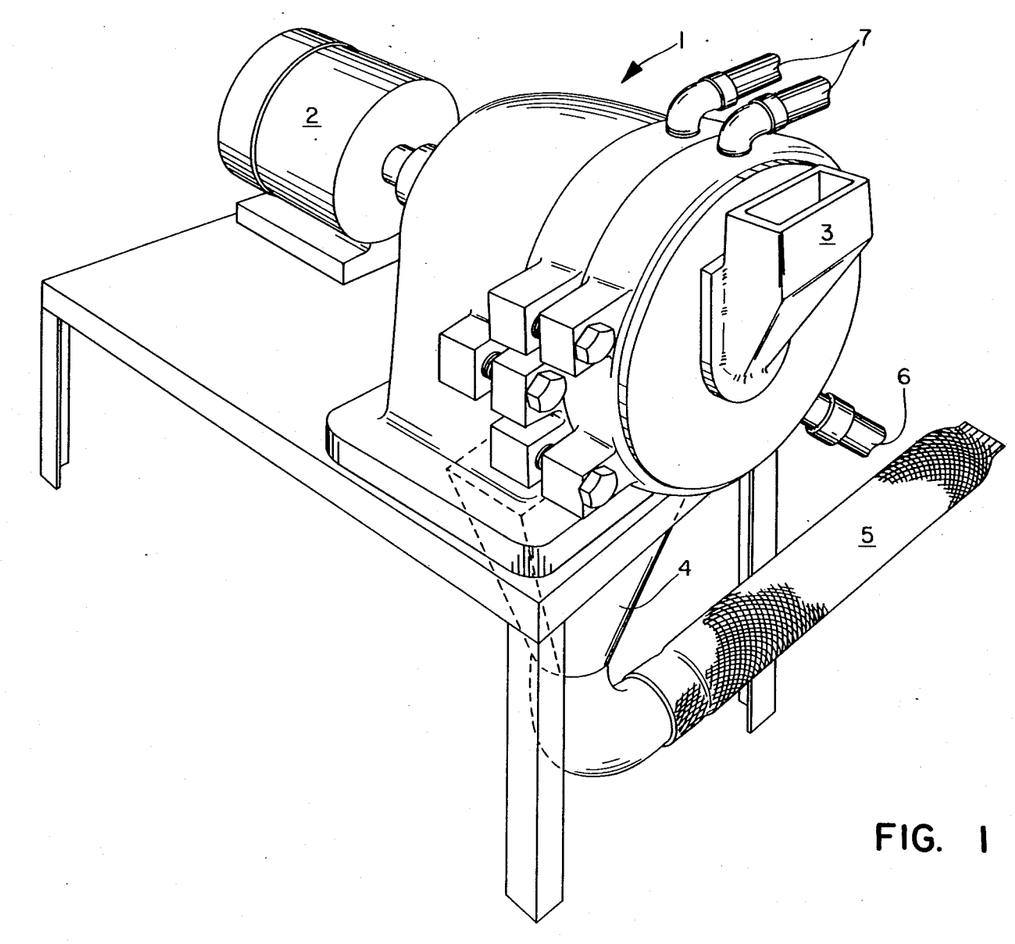
FIG. 1 is a perspective view of an example of a fiberizer apparatus used to carry out the process of this invention.

Directing attention first to FIG. 1, the invention will be described in greater detail. The fiberization apparatus illustrated in FIG. 1, a turbomill was used to gather the information provided herein. However, those skilled in the art will appreciate that a variety of fiberization apparatus is available to carry out the process of this invention, such as hammermills, disc mills, pin mills, wing beater mills, etc. In general, the fiberizer 1 comprises a housing which encloses rotating rotor blades (See FIG. 2) driven by a suitable drive means 2. The secondary fiber source, e.g. printed waste paper, which may be shredded, is fed to the fiberizer through feed inlet 3 and the waste paper is comminuted or fiberized substantially to individual fibers and fines. An internally disposed fan draws air in through the feed inlet 3 along with the waste paper, and expels the air through exit port 4 carrying the fibers and fines along with the air. The fibers are collected in a tubular meshed bag 5 which permits the fines to pass through the mesh openings while retaining the fibers. The specific meshed bag 5 material which was found to work satisfactorily had a mesh size of 50×60 openings per inch. The wire diameter was 0.009 inch and the openings were 0.006 inch by 0.012 inch. The open area of the screen was 23% of the surface area. Also shown in FIG. 1 is cooling means having water supply inlet 6 and exit ports 7 for removing heat generated due to friction by the shearing of the fiber feedstock. Aside from the tubular meshed bag, fiberizers as illustrated in FIG. 1 are commercially available equipment. Such a fiberizer is illustrated in U.S. Pat. No. 3,069,103. The specific apparatus illustrated and used for purposes herein was a Pallman Ref. 4 fiberizer.

Figure 2:
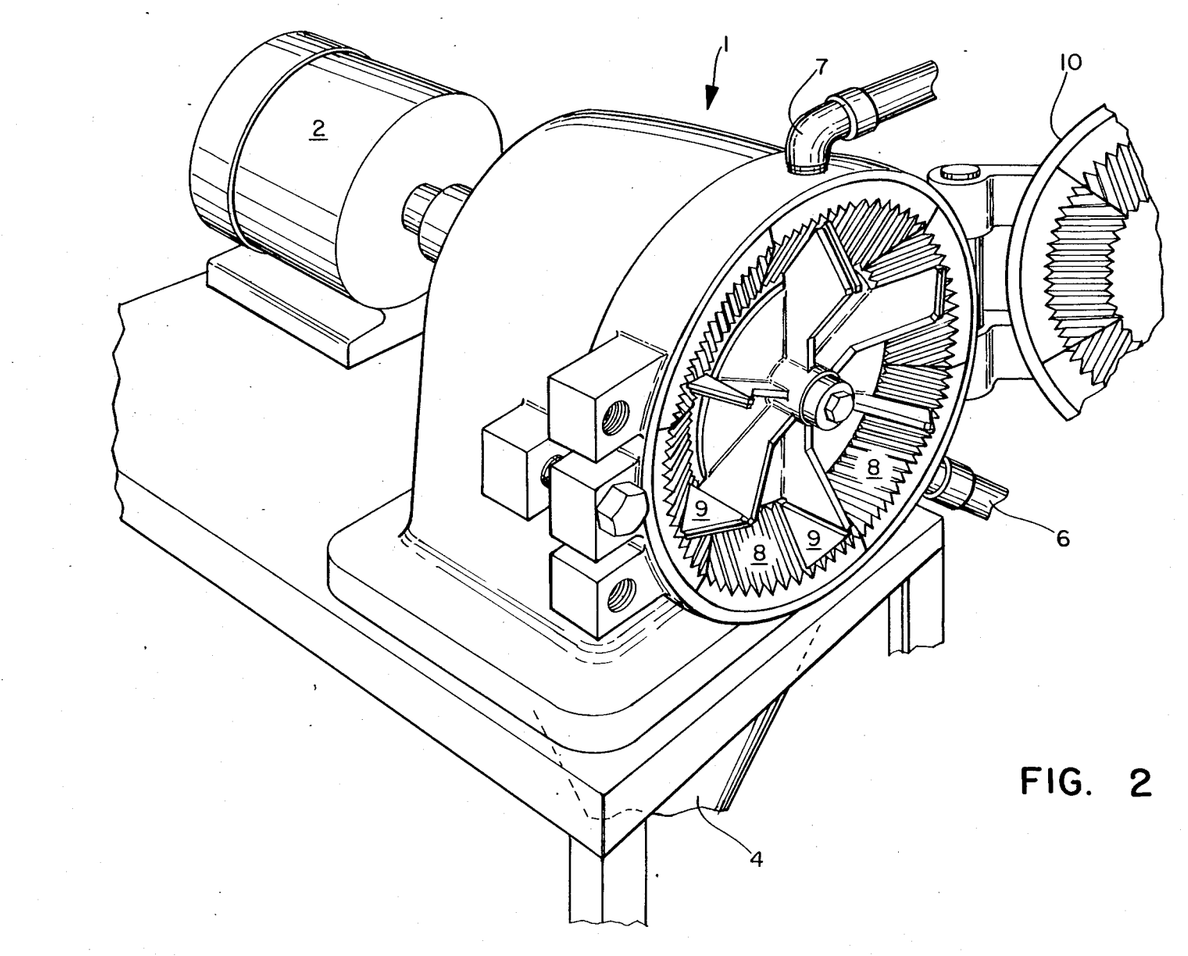
FIG. 2 is a perspective view of the fiberizer of the type of FIG. 1 with the front lid opened to expose the impeller blades and the serrated working surface.

FIG. 2 illustrates the internal working chamber of the fiberizer, primarily illustrating the position of the rotor blades. There is shown a serrated, grooved working surface 8 against which the feed material is abraded by the action of the moving rotor blades 9. Although not clearly shown in this Figure, there is a space between the serrated working surface and the blades in which cellulosic materials are buffetted about. The blade position relative to the working surface 8 is adjustable to add a degree of control over the extent of fiberization, which is also controlled by the rotor speed, the residence time, and nature of the working surface. The working surface 8 consists of six removable segments. These can be replaced by a greater or fewer number of segments having a different design or configuration with respect to the surface. This flexibility provides an infinite number of choices for altering and optimizing the fiberization. However, the configuration illustrated herein has worked very satisfactorily. More specifically, the grooves of each segment as shown are parallel to each other and are spaced apart by about 2 millimeters (mm.), measured peak-to-peak. Each groove is about 1.5 mm. deep. The radial width of each segment is about 10 centimeters (cm.) These dimensions are given only for purposes of illustration and are not limiting, however. Also partially shown is the working surface on the inside of the hinged cover 10, which is substantially identical to the other working surface 8 already described. When the cover is closed, the two working surfaces provide an inner chamber in which the feed material is fiberized.

Figure 3:
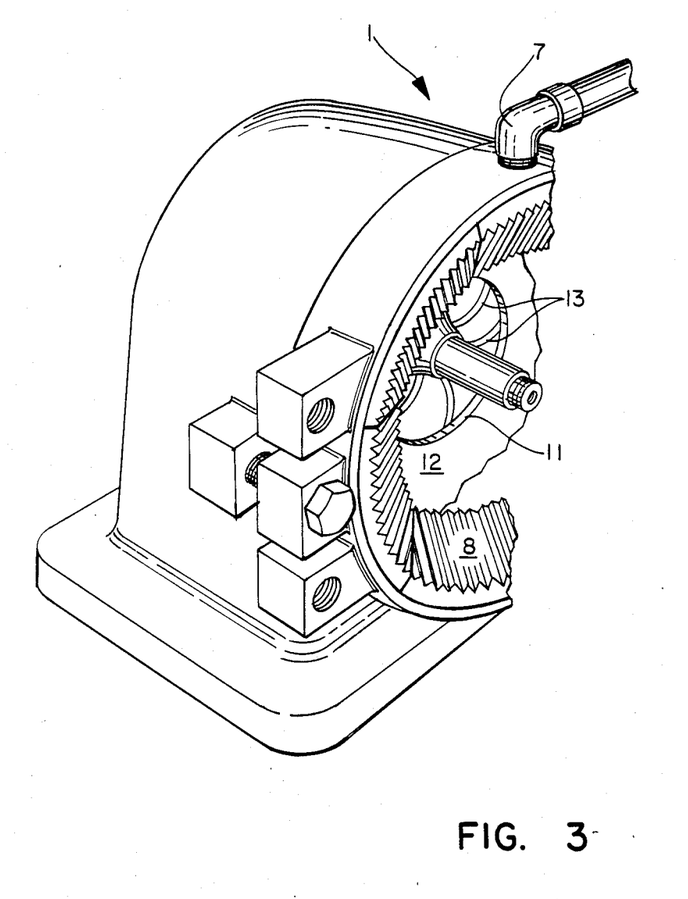
FIG. 3 is a cut-a-way perspective view of the opened fiberizer with the impeller removed to expose the orifice through which the processed fibers are withdrawn from the working chamber.

FIG. 3 is cut-a-way perspective of the fiberizer with the rotor removed to expose the orifice 11 through which the fiberized material passes before exiting through the exit port 4. The size of the orifice is a variable which controls the degree of fiberization by increasing or decreasing the air flow rate and hence the residence time within the fiberizer. The orifice is contained within a removable plate 12 for convenient changing of the orifice size. An orifice diameter of 160 mm. has been found to be suitable in conjunction with an air flow rate of about 10 cubic meters per minute. Also shown in FIG. 3 are the impeller blades 13 of the fan which provides the flow of air through the fiberizer.

Figure 4:
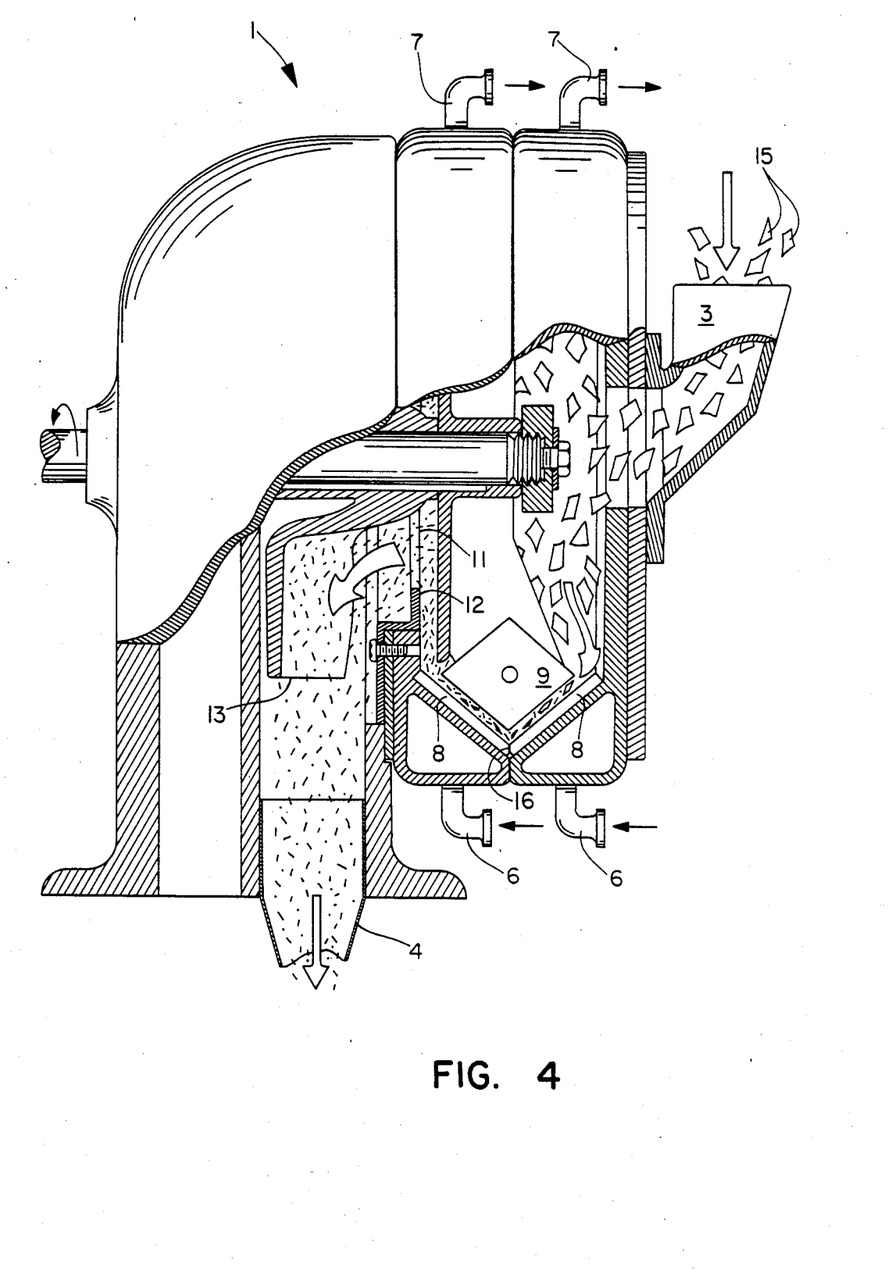
FIG. 4 is a side elevation of the fiberizer partially in section illustrating its operation.

FIG. 4 is a cross-sectional, cut-a-way view of the fiberizer schematically illustrating its operation. The arrows indicate the direction of flow of air and fibers. More specifically, secondary fiber source 15 is introduced into the feed inlet 3 where it is contacted by the rotating blades 9. The air flow directs the secondary fiber source between the rotor blades and the working surface 8 such that the secondary fiber source is comminuted into smaller and smaller particles, eventually being reduced or fiberized to substantially discrete fibers and fines. The centrifugal forces created by the rotor blades tend to force the particles, preferentially the larger particles, to the apex 16 between the angled working surfaces. These forces tend to keep the larger particles from escaping before they have been completely fiberized. Upon substantially complete fiberization, the comminuted solid materials are carried through the orifice 11 of the removable plate 12. The fan impellers 13 then force the airborne fibers out through the exit port 4.

Figure 5:
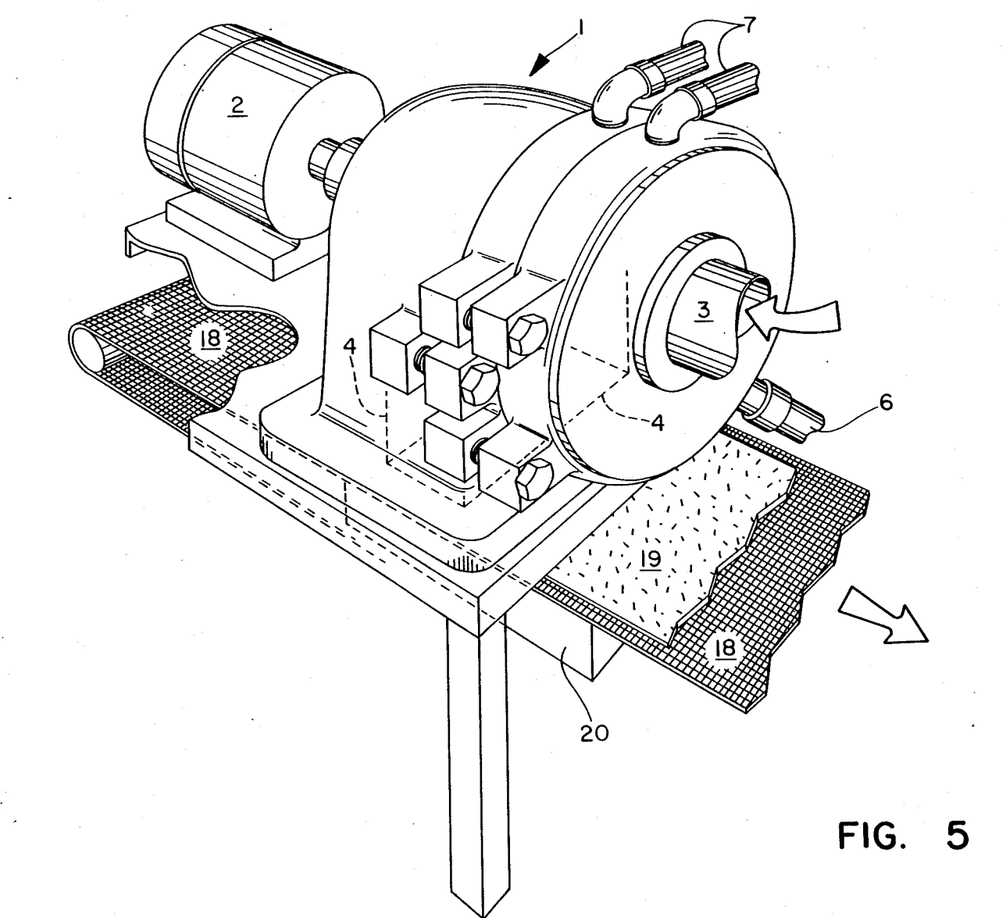
FIG. 5 is a perspective view of a fiberizer modified to operate in a continuous mode.

FIG. 5 illustrates the operation of the fiberizer previously described, but slightly modified for continuous operation as would likely be required for commercial operation. In this embodiment, the feed inlet 3 is shown as a tubular inlet rather than the hopper as shown in FIG. 1. The feed tube will provide a continuous supply of shredded secondary fiber sources material of suitable size and quality. Generally speaking, such a material can be in form of sheets of from about 2 to about 4 inches square or less and should be free of debris to protect the fiberization apparatus. However, the particle size and shape of the feed will depend on the capabilities of the particular fiberizer being used and is not a limitation of this invention. Rip shears can be and were used, for example, for shredding the secondary fiber sources used to gather the data presented in Tables I-III. A further modification illustrated is the continuously moving screen 18 which collects the fibers in the form of a web or batt 19. The mesh of the screen is selected to allow the fines to pass through, preferably aided by a vacuum box 20 which collects fines and channels them to an appropriate recovery site. A wire cloth from W. S. Tyler Incorporated having a mesh of 150 (150 openings per linear inch) a wire diameter of 0.0026 inch, an opening width of 0.0041 inch, and an open area of 37.4% has been found to work best when producing a web having a basis weight of about 12 lb./2800 square feet or less. Thicker webs tend to trap the fines within the web itself regardless of the size of the wire openings. Shown in phantom lines is a modified exit port 4 which has been widened to accommodate the width of the moving screen. In actual practice on a continuous basis, for example, shredded wastepaper was fed to the Pallman fiberizer at a rate of 1.5 pounds per minute. The fiberizer was set up with a 3 mm. clearance between the serrated working surface and the rotor blades. A removable plate having an orifice of 140 mm. was installed behind the impeller, which travelled at 4830 rounds per minute (r.p.m.) with no load. Air flow through the fiberizer was about 365 cubic feet per minute. Cooling water was fed to the cooling jacket at the rate of 2 liters per minute. Initial water temperature measured 59–60 degrees Fahrenheit (°F.) and levelled off at 66°–68° F. after an extended run. The speed of the wire receiving the fiberized material from the fiberizer was set at 350 feet per minute. Vacuum under the wire measured 0.6 inch of water. About 18.85% of the secondary fiber source passed through the wire as fines, whereas the remainder was collected on the wire as a dry deinked product. The fines portion contained about 75 weight percent fiber particulates and about 25 weight percent clay (filler).

Figure 6:
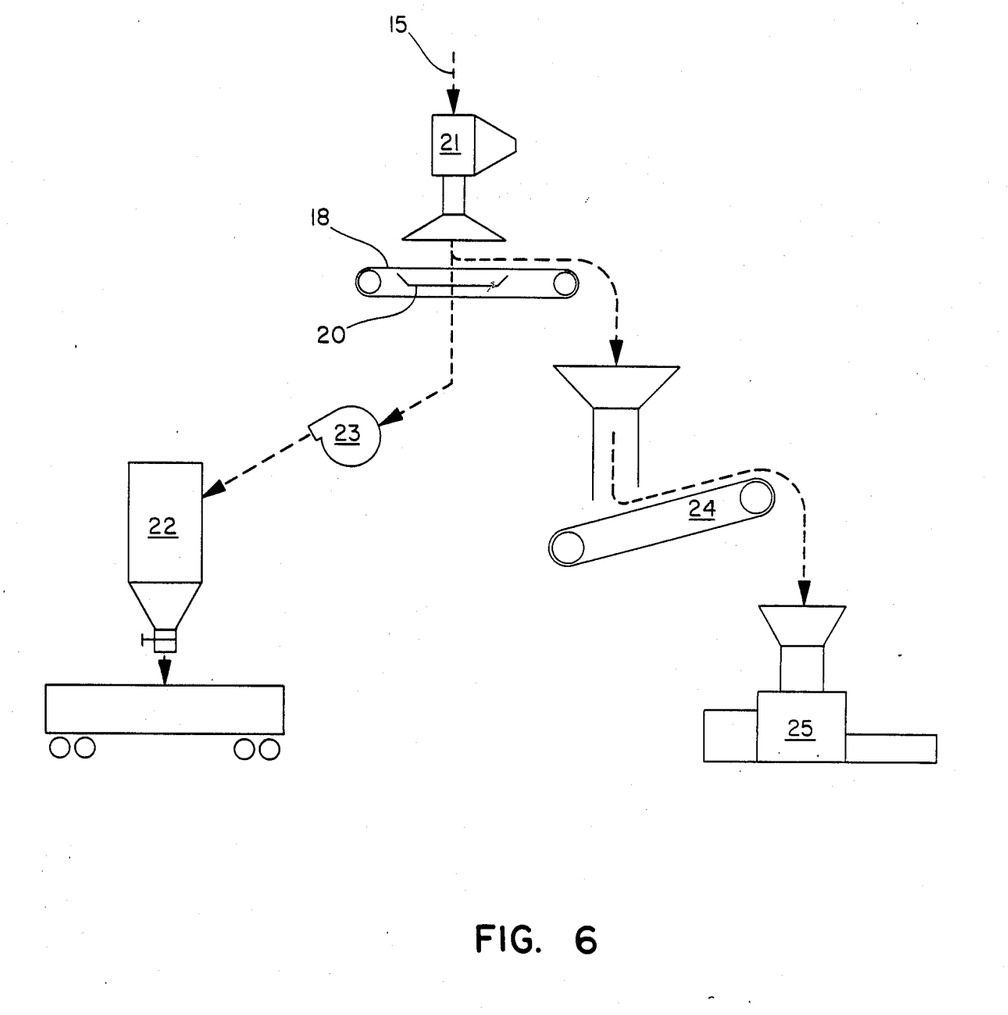
FIG. 6 is a schematic flow diagram illustrating a process in accordance with this invention.

FIG. 6 schematically illustrates an overall view of a process in accordance with this invention. More particularly, it shows a source of secondary fibers 15 being fed to a fiberizer 21 identical to or similar in function to the type described in the previous Figures. As previously suggested, for most fiberizers it is probably preferable to first shred the secondary fiber source. In the fiberizer the secondary fiber source, whether shredded or not, is substantially reduced to individual or discrete fibers and fines and deposited on a moving screen 18. Deposition of the fibers onto the screen is aided by a vacuum box 20 which facilitates fines removal. The fines include much of the ink present in the raw feed and are collected in a suitable receptacle 22 for disposal. Vacuum for the vacuum box is provided by fan 23, which pulls the fines through the screen and blows them into the receptacle 22. The fibrous mass or batt of fibers deposited on the moving screen is thereafter recovered by metering to a uniform thickness in a suitable metering device 24 and thereafter converted into bales of pulp in a baler 25 or, alternatively, fed directly into a pulper to form a pulp slurry for making paper in the conventional manner. In addition, the recovered fibers can be fed directly to an air-forming apparatus for producing air laid webs or batts. Those skilled in the art will recognize that a variety of apparatus or equipment can be used in performing the functions illustrated herein. For example, the moving screen 18 can be replaced with a static screen separator such as that described in the co-pending U.S. patent application Ser. No. 190,790, of Byron S. Terry and Kurt Niederer, filed Oct. 24, 1985, entitled Separator, which is assigned to the assignee of the present invention and is hereby incorporated by reference. The static screen separator disclosed in this application provides increased screen life due to the lack of flexing of the screen in use.

Figure 7:
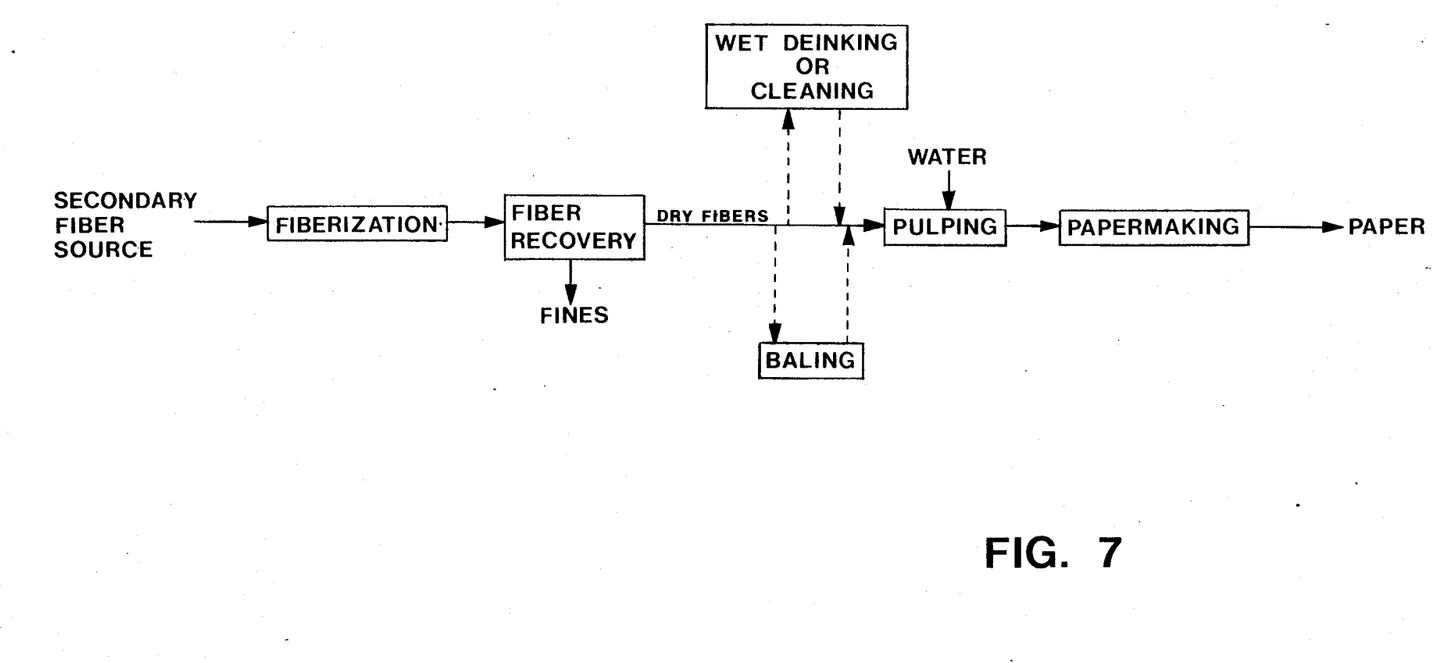
FIG. 7 is a block diagram illustrating the use of this invention in connection with making paper.

FIG. 7 further illustrates the process of this invention with a block diagram showing the overall process for making paper using fibers recovered from a dry-deinked secondary fiber source. As shown, an ink-bearing secondary fiber source (such as printed waste paper) 30 is fiberized air dry to produce substantially discrete fibers and fines. The fines are separated from the fibers in any suitable manner leaving the recovered fibers to be used as desired. There are at least several options. As shown, the fibers can be baled for subsequent pulping as shown by the phantom lines. They also can be fed directly to an air-former to produce air-laid webs. Alternatively, the fibers can be cleaned, as by aqueous centri-cleaning (illustrated in Tables IV and V), or by wet deinking methods which are well known in the industry and exemplified by the wet deinking patents previously described herein. In either case, the resulting fibers can be pulped by slurrying with water and diluted into papermaking stock of an appropriate consistency. The papermaking stock is then wetlaid to form a fibrous web and dried to form a paper sheet. The specific papermaking steps can vary but are also well known in the art. The dry-deinked fiber of this invention is useful as a secondary fiber for tissue, fine paper, printing paper, and other papers.

EXAMPLES

In order to illustrate the effectiveness of the process of this invention, six different secondary fiber sources were mechanically fiberized in accordance with this invention as previously described using the fiberizer illustrated in FIGS. 1-4. The six different samples were computer printout, Xerocopy Bond,[1] ink-coated board cured by ultra-violet light (UV-coated board), lacquered board, newsprint, and magazines. The second, third, and fourth samples mentioned above are virtually untreatable by standard wet deinking processes. All of the secondary fiber sources were air dry and were processed at room temperature. However, it will be appreciated that certain inks and sizes can be more optimally processed at higher temperatures where they are more friable and therefore form finer particles more easily. On the other hand, some inks or sizes may be thermoplastic and therefore can be more easily processed at lower temperatures. [1]Husky[2] Xerocopy Bond, (Eastman Kodak) photocopy paper The optimum processing temperatures will therefore depend upon the properties of the specific predominant secondary fiber source and the economics of providing a suitable temperature.

Deinked fibers recovered by subjecting each sample to the process of this invention (Test) and non-deinked fibers (Control) recovered by shredding each sample into small pieces and slurrying in warm water (110° F.) with gentle mixing to break the fiber-to-fiber bonds of the sample were each used in an aqueous slurry as a pulp for making paper handsheets in a conventional manner. The handsheets so formed were then tested for brightness using an Elrepho Photoelectric Reflectance Photometer (ISO 3688) and ash content (a measure of coating and/or filler removal (TAPPI T211M-58)). In addition, the Test and Control pulps were also tested for their drainage properties (Canadian Standard Freeness TAPPI T227m-58). The results are set forth in Tables I, II, and III below.

TABLE I

| (Canadian Standard Freeness (ml.)) | | |
|---|---|---|
| Sample | Control | Test |
| Computer Printout | 380 | 590 |
| Xerocopy | 500 | 700+ |
| UV-Coated Board | 500 | 700+ |
| Lacquered Board | 500 | 700+ |
| Newsprint | 100 | 270 |
| Magazine | 130 | 280 |

TABLE II

| (Ash Content (weight percent)) | | |
|---|---|---|
| Sample | Control | Test |
| Computer Printout | 10.3 | 6.2 |
| Xerocopy | 9.3 | 4.6 |
| UV-Coated Board | 4.6 | 2.4 |
| Lacquered Board | 5.1 | 3.2 |
| Newsprint | — | — |
| Magazine | 23 | 15 |

TABLE III

| (Brightness) | | |
|---|---|---|
| Sample | Control | Test |
| Computer Printout | 72 | 77 |
| Xerocopy | 81 | 85 |
| UV-Coated Board | 75 | 78 |
| Lacquered Board | 79 | 82 |
| Newsprint | 35 | 44 |
| Magazine | 51 | 58 |

As is clear from the resulting data, the brightness and ash content of the final sheet were improved when the fibers recovered from the process of this invention were used to form the sheet. In addition, the drainage properties (freeness) of the pulp was also improved by the dry-deinking process of this invention. The dry-deinked samples also exhibited a dramatic reduction in the number of visible ink specs when compared to the untreated samples. Although not specifically measured, this improvement is at least partially reflected in the brightness measurements.

In addition to being a sole treatment for a secondary fiber source to be used as a feedstock for papermaking, the dry deinking process of this invention can also be used as a pretreatment to be followed by further cleaning of the fibers or a conventional wet deinking process. As a pretreatment, this process will decrease wet sludge formation during the wet deinking process (which minimizes the disposal problem created by the sludge formation) and reduces chemical costs since a portion of the inks will have already been removed prior to the subsequent wet deinking treatment. Tables IV and V contain comparative data for deinked cigarette cartons, illustrating improvement in some of the physical properties of two secondary fiber sources (cigarette cartons) when dry-deinked and subsequently cleaned in a hydroclone (centricleaning).

TABLE IV
(WINSTON Cigarette Cartons)

|  | WET DEINKING | DRY DEINKING | DRY DEINKING PLUS CENTRI-CLEANING |
|---|---|---|---|
| Freeness | 616 | 619 | 700 |
| Elrepho Brightness | 76.5 | 75.3 | 77.6 |
| Ash, % | — | 3.3 | 1.8 |

TABLE V
(SALEM Cigarette Cartons)

|  | WET DEINKING | DRY DEINKING | DRY DEINKING PLUS CENTRI-CLEANING |
|---|---|---|---|
| Freeness | 636 | 658 | 699 |
| Elrepho Brightness | 81.2 | 79.5 | 79.9 |
| Ash, % | — | 3.0 | 2.1 |

In each Table the first column contains physical property data for the product obtained by subjecting the particular sample to a conventional wet deinking process. The particular process used is of no consequence with respect to the process of this invention, but merely serves as a benchmark for purposes of comparison. Specifically, the deinking solution comprised 3.0 grams sodium hydroxide, 0.2 grams tetrasodium pyrophosphate, 0.2 grams Armak Ethofat 242/25 surfactant, and 1667 ml. water. The deinking solution was heated to 180° F. and 50 grams of oven dried waste paper cut or torn into half inch pieces was added with mixing. After fiberization of the sample occurred, the sample was washed three times by diluting with water to a consistency of 1%. The washed product was then tested for Canadian Standard Freeness and formed into handsheets for the brightness tests.

The second column contains corresponding data for the products of the dry deinking process of this invention as previously described.

The third column contains corresponding data for the products obtained by centricleaning the fibers obtained from the dry deinking step of the second column. In particular, the dry deinked fibers were slurried with water to a feed consistency of about 0.5 dry weight percent. The slurried fibers were fed under 42 pounds per square inch gauge (psig.) pressure to a Bauer "600N" Centricleaner at a rate of approximately 40 gallons per minute. The particular apparatus referred to is a hydroclone (liquid cyclone) of a nylon construction having a generally conical shape with a 3 inch nominal internal diameter at the top and a height of approximately 36 inches. The centricleaner serves to separate the fibers from smaller and more dense particulates in a manner well known to those familiar with mechanical separations.

These results illustrate the effectiveness of the dry deinking process of this invention as a pretreatment followed by cleaning, especially with regard to fines reduction as measured by the increased freeness in both samples. In addition the brightness of both washed samples was slightly improved over the dry-deinked product.

Although not illustrated, the dry-deinked fibers can also be subsequently wet-deinked by conventional means well known to those skilled in the art of deinking. For example, the dry-deinked fibers can be slurried in the deinking solution previously described herein for a period of time to remove additional ink and washed and/or centricleaned.

It therefore is appreciated that the invention has application either as a deinking process, per se, or as a process in combination with other paper-making processes. Further, the invention has numerous advantages not achieved by the prior art.

I claim:

1. A method of deinking an ink-bearing secondary fiber source comprising mechanically completely fiberizing the secondary fiber source to produce substantially discrete fibers and ink-bearing fines and separating the ink-bearing fines from said fibers, said fiberizing and separating occurring with less than about 20 weight percent moisture, whereby said fibers are suitable as secondary fiber.

2. A method according to claim 1 wherein said secondary fiber source is air dry.

3. The method of claim 1 wherein said ink-bearing fines are separated from said fibers by passing the ink-bearing fines through a screen having a mesh size sufficiently small to prevent passage of said fibers.

4. The method of claim 1 wherein the separated fibers are directly slurried in water for making a cellulosic product.

5. The method of claim 1 wherein the separated fibers are fed directly to an air-former.

6. The method of claim 1 wherein the separated fibers are formed into a substantially uniform batt and baled.

7. The method of claim 1 wherein the separated fibers are cleaned in an aqueous solution.

8. The method of claim 7 wherein the separated fibers are cleaned in a hydroclone.

9. The method of claim 7 wherein the separated fibers are cleaned by a wet deinking method.

10. The method of claim 1 wherein the secondary fiber source is selected from the group consisting of computer printout paper, photocopy paper, ink-coated board cured by ultra-violet light, lacquered board, newsprint, cigarette cartons, and magazines.

11. A method of deinking an ink-bearing secondary fiber source having a surface size comprising mechanically completely fiberizing the secondary fiber source to produce substantially discrete fibers and ink-bearing fines and separating the ink-bearing fines from said fibers, said fiberizing and separating occurring with less than about 20 weight percent moisture, whereby said fibers are suitable as secondary fiber.

12. A process for deinking an ink-bearing secondary fiber source and for making paper therefrom comprising:
 (a) mechanically completely fiberizing the secondary fiber source to produce substantially discrete fibers and ink-bearing fines, said fiberizing occurring with less than about 20 weight percent moisture;

(b) separating said ink-bearing fines, said separation occurring with less than about 20 weight percent moisture;

(c) slurrying said fibers with water to form a papermaking stock;

(d) wet-laying the papermaking stock to form a web of fibers; and (e) drying the web.

13. The method according to claim 1 wherein the fibers and ink-bearing fines have a moisture content in the separating step substantially no greater than the moisture content of the secondary fiber source in the fiberizing step.

14. The method of claim 13 wherein the secondary fiber source is substantially air dry in the fiberizing step and wherein both the fibers and the ink-bearing fines are substantially air dry in the separating step.

15. The method of claim 13 wherein said ink-bearing fines are separated from said fibers by passing the ink-bearing fines through a screen having a mesh size sufficiently small to prevent passage of said fibers.

16. The method of claim 14 wherin said ink-bearing fines are separated from said fibers by passing the ink-bearing fines through a screen having a mesh size sufficiently small to prevent passage of said fibers.

17. The process of claim 12 wherein the secondary fiber source is substantially air dry in the fiberizing step and wherein the ink-bearing fines and the fibers are substantially air dry in the separating step.

18. The process of claim 12 wherein the ink-bearing fines and the fibers have a moisture content in the separating step substantially no greater than the moisture content of the secondary fiber source in the fiberizing step.

19. The process of claim 17 wherein said ink-bearing fines are separated from said fibers by passing the ink-bearing fines through a screen having a mesh size sufficiently small to prevent passage of said fibers.

20. The process of claim 18 wherein said ink-bearing fines are separated from said fibers by passing the ink-bearing fines through a screen having a mesh size sufficiently small to prevent passage of said fibers.

21. A method of deinking an ink-bearing air dry secondary fiber source comprising mechanically completely fiberizing the secondary fiber source air dry to produce substantially discrete fibers and ink-bearing fines and separating a substantial portion of the ink-bearing fines from the fibers air dry, whereby said fibers are suitable for papermaking.

22. A method of deinking an ink-bearing secondary fiber source comprising mechanically completely fiberizing the secondary fiber source air dry in a turbomill to produce substantially discrete fibers and ink-bearing fines and separating the ink-bearing fines from the fibers air dry, whereby said fibers are suitable for papermaking.

23. A methdd of deinking an ink-bearing secondary fiber source comprising mechanically completely fiberizing the secondary fiber source air dry to produce substantially discrete fibers and ink-bearing fines and separating the ink-bearing fines from the fibers air dry, whereby handsheets made from said fibers are brighter than handsheets made from the secondary fiber source.

* * * * *